P. HINKLE.

ELEVATOR.

No. 6,993. Reissued March 14, 1876.

Witnesses

Geo. H. Strong.

Jno. L. Boone

Inventor

Philip Hinkle by Dewey & Co.

Attys

N. PETERS, PHOTO-LITHOGRAPHER, WASHINGTON, D. C.

UNITED STATES PATENT OFFICE.

PHILIP HINKLE, OF SAN FRANCISCO, CALIFORNIA.

IMPROVEMENT IN ELEVATORS.

Specification forming part of Letters Patent No. 155,306, dated September 22, 1874; reissue No. 6,993, dated March 14, 1876; application filed February 15, 1876.

*To all whom it may concern:*

Be it known that I, PHILIP HINKLE, of San Francisco city and county, State of California, have invented an Improvement in Elevators; and I do hereby declare the following description and accompanying drawings are sufficient to enable any person skilled in the art or science to which it most nearly appertains to make and use my said invention or improvement without further invention or experiment.

My invention relates to certain improvements in elevators, which especially adapt them for use upon sidewalks, areas, basements, and in all places where elevators are to be employed to deliver merchandise at low elevation, as from a cellar or basement to the first floor or sidewalk. It consists, first, in a novel method of operating the elevator by means of ropes attached to its four corners, and conducted by pulleys to the winding-drums, so that I am enabled to do away with two of the pulleys now used in these elevators, and keep the platform at all times level in its movements. It consists, secondly, in so constructing the elevator-platform that it can be raised above the level of the sidewalk or floor to deliver the goods directly upon a car or vehicle.

My invention further consists in the combination, with the driving-shaft of the elevator, of a clutch and compress-brake, by which the platform can be held at any point of its elevation without the use of a pawl and ratchet.

Figure 1:
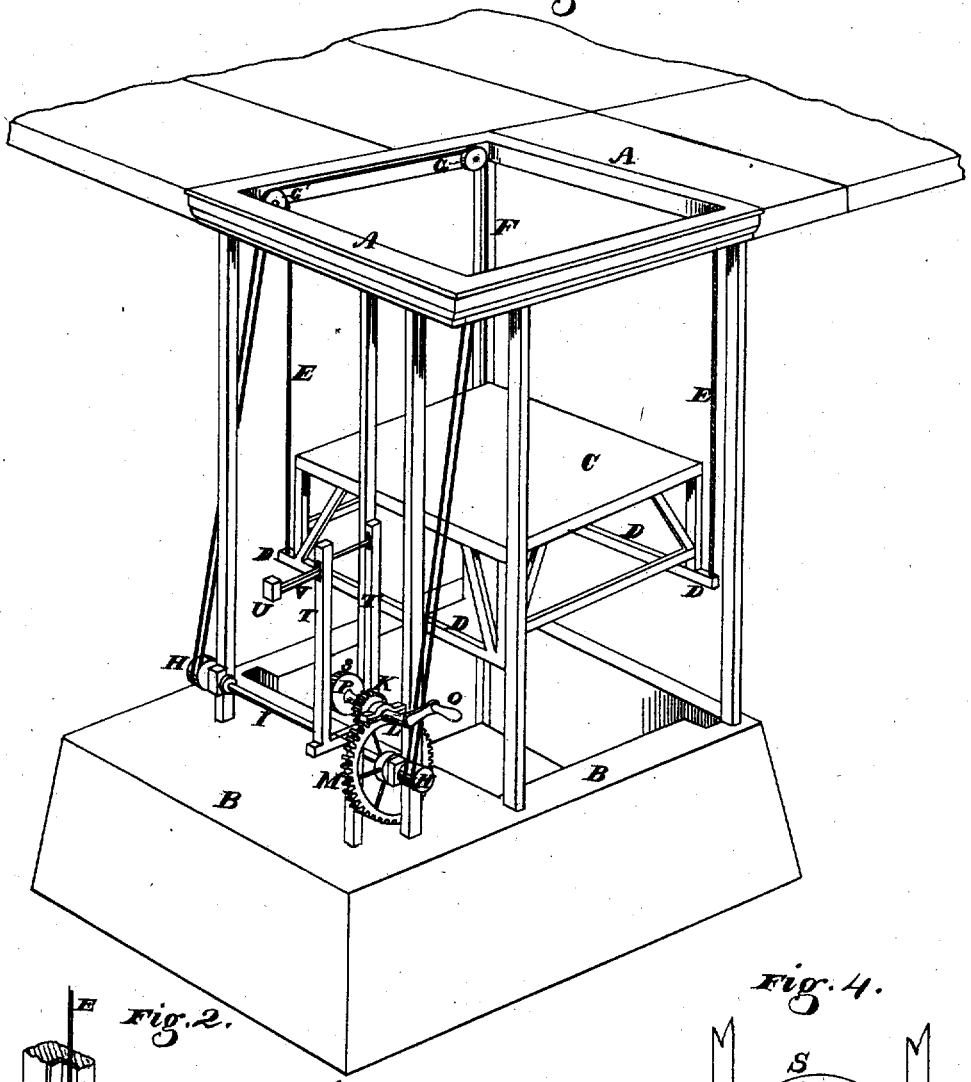
Figure 2:
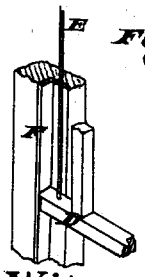
Figure 3:
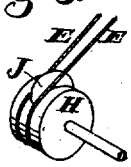
Figure 4:
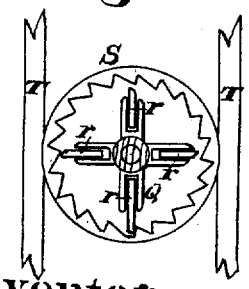

Referring to the accompanying drawing for a more complete explanation of my invention, Figure 1 is a perspective view of my elevator. Fig. 2 is an enlarged view of one of the guides and part of the platform-frame with its attached rope. Fig. 3 shows the drum for the double ropes. Fig. 4 is a view of the clutch and brake.

A represents the level of the sidewalk, and B the floor of the basement, between which points the elevator-platform C is to operate. This platform has a frame-work extending below it, and to the cross-timbers D the ends of the flexible wire ropes E are secured.

The object of securing the elevating-ropes below the platform is to enable me to raise the platform to such a height above the level of the sidewalk or upper floor that goods can be transferred directly to or from the wagon or dray without any lifting.

In order to guide my platform in its movement, I groove the timbers at two or more of the opposite corners, as shown at F, and within these grooves the ends of the timbers D are fitted to travel. The grooves may be lined with angle or strap iron, and the ends D are also iron-bound to prevent wear.

By this arrangement I am enabled to do away with the side timbers and give plenty of space for loading or unloading the platform at the lower level, while the platform is more steady in its movement.

Elevators have hitherto been constructed for this class of work having the platform suspended from two ropes, which unite and form a single rope at a point so high that only the single rope or chain ever winds upon the drum. The single chains extend down to drums which are secured to a shaft passing below the level of the cellar-bottom or the resting-place of the platform. This construction requires six pulleys at the top of the frame, and additional gears to connect the operating-shaft with the drum-shaft, while the drums, besides being (with their chains) in the way while loading and unloading, are so situated as to get rusty and out of order, especially in a damp cellar, and the ropes cannot be easily adjusted if they become unequally stretched.

In my elevator four wire ropes, E, are employed, one being secured to each end of the cross-beams D, so as to lift from the four corners of the platform. These ropes pass over pulleys G G′ just beneath the sidewalk or upper floor. The pulleys are all made of the same size, so that there will be an even movement of the ropes, and the outer ropes are carried horizontally across from the pulleys G to the pulleys G′, which have a second groove to accommodate them. From these pulleys the ropes pass down to the drums H, which are secured to the shaft I, one in a line with each pair of ropes E.

The ropes are secured to the drums by an adjusting device, not shown in this application, and by this device any variation in the length of the ropes may be compensated, and the platform kept level at all times.

The drums H are suitably constructed, as shown, so as to guide the ropes, and prevent them from overriding each other as they wind upon the drum. The ropes are attached near the center of the drum, so that they wind outward from each other as the platform goes up, and, by thus securing them at the center, and also by leaving no rope coiled upon the drum when the platform is down, there will be no danger of the ropes slackening so as to slip off the drum, or leave their guiding-grooves. The drums and shaft are placed entirely at one side of the elevator from the manner in which the ropes connect them from the pulleys G, and they are placed at such a height as to be easily accessible, and there is no necessity of an extra gear-wheel between the pinion and the gear upon the drum, as when the drum is situated low down. By this construction it will be seen that the drums and crank-shaft may be removed to a considerable distance from the platform, by simply lengthening the wire ropes, when there is not space enough for all the apparatus near the elevator. A pinion, K, upon the driving-shaft L meshes into the gear-wheel M upon the drum-shaft I. The shaft L may be operated by any suitable power, but in the present case I have shown the hand-cranks O.

In elevators as hitherto constructed a dog or pawl and ratchet-wheel have been necessary to hold the load at any desired point, and when the platform was to be lowered the whole weight must first be lifted until the pawl could be disengaged, after which a friction-band was employed to regulate the descent. In order to control the movements of the platform I employ a clutch, P, which is secured directly to the driving-shaft L. In the present case a clutch is shown having an internally-corrugated rim, S, and sliding bar *r*, which engage with the corrugations; but it will be manifest that any form of clutch which is suitable may be used with the same result, it being only necessary that the shaft L be allowed to turn freely in a direction to elevate the cage, while the rim S is held stationary by the compress-levers T T upon each side during the elevation, and until it is desired to lower the platform.

When it is necessary to lower the platform, the weight U upon the knee-lever arm V is raised, thus allowing the clutch to turn bodily, by relieving the rim S from the pressure of the compress-levers T.

By this construction I am enabled to do away with the dog or pawl and ratchet, and the load can be stopped at any point. It can be allowed to start again from the same point without first raising the whole load, as must occur in order to free the dog, when one is used, and the strap and lever are also avoided.

As the four ropes E which support my platform all pass over the pulleys G G′ from the same side, it always gives me a space between the guides upon that side, and the frame of the floor opening at A, both to give light when the platform is up, and allow the operator to pass up and down a ladder, without being obliged to go around by some other way.

Having thus described my invention, what I claim, and desire to secure by Letters Patent, is—

1. The platform C, in combination with the frame D D and hoisting-ropes E attached thereto at the corners, so that the platform can be raised above the level of the pavement A, substantially as set forth.

2. In an elevator, the pulleys G G and G′ G′, the latter provided with secondary grooves and the four ropes E, in combination with the drum H, the whole constructed to operate substantially as set forth.

3. An elevator consisting of the platform C, elevating-ropes E, pulleys G and G′, in combination with the drums H, shaft I, and driving-shaft L, said drums and shaft being capable of removal to a distance to one side of the elevator, substantially as herein described.

PHILIP HINKLE.

Witnesses:
GEO. H. STRONG,
JNO. L. BOONE.